(12) United States Patent
Balasubramanyan et al.

(10) Patent No.: US 8,412,836 B2
(45) Date of Patent: Apr. 2, 2013

(54) USER AUTHENTICATION ACROSS MULTIPLE NETWORK STACKS

(75) Inventors: Balaji Balasubramanyan, Redmond, WA (US); Miko Arnab Sakhya Singha Bose, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 12/831,791

(22) Filed: Jul. 7, 2010

(65) Prior Publication Data
US 2012/0011259 A1 Jan. 12, 2012

(51) Int. Cl.
*G06F 15/16* (2006.01)
(52) U.S. Cl. .................. 709/228; 709/227; 709/229
(58) Field of Classification Search .......... 709/229, 709/236, 238; 713/150; 455/403
See application file for complete search history.

(56) References Cited

U.S. PATENT DOCUMENTS

| | | | |
|---|---|---|---|
| 5,594,921 A * | 1/1997 | Pettus | 709/229 |
| 5,684,950 A | 11/1997 | Dare | |
| 5,774,551 A | 6/1998 | Wu | |
| 7,080,404 B2 | 7/2006 | Abdo | |
| 7,100,200 B2 | 8/2006 | Pope | |
| 7,707,626 B2 | 4/2010 | Albisu | |
| 2002/0041605 A1 * | 4/2002 | Benussi et al. | 370/467 |
| 2004/0225878 A1 * | 11/2004 | Costa-Requena et al. | 713/150 |
| 2006/0229054 A1 * | 10/2006 | Erola et al. | 455/403 |
| 2009/0093237 A1 * | 4/2009 | Levenshteyn et al. | 455/412.1 |
| 2010/0146145 A1 * | 6/2010 | Tippin et al. | 709/236 |

OTHER PUBLICATIONS

"Authentication, Authorization and Detection"; Enterasys Networks, Inc.; copyright 2007, 5 pages.
"Security and Safety Features New to Windows Vista"; Wikipedia®; May 16, 2010, 12 pages.
Carr, Jim; Holy Grail of IDs; May 22, 2008, 10 pages.

* cited by examiner

*Primary Examiner* — Quang N Nguyen
(74) *Attorney, Agent, or Firm* — Merchant & Gould

(57) ABSTRACT

A computing device provides an application that uses multiple protocol stacks to communicate with a server. The server requires messages from each of the protocol stacks to include a credential for a user of the computing device. The credential is a set of information that includes identification and proof of identities that is used to gain access to a resource. However, the user is not prompted for the credential more than once. In some embodiments, this is accomplished by storing the credential at the computing device for retrieval by the protocol stacks when the application uses the protocol stacks to communicate with the server.

20 Claims, 9 Drawing Sheets

USER AUTHENTICATION ACROSS MULTIPLE NETWORK STACKS

BACKGROUND

Client devices can communicate with servers for a variety of reasons. For example, a client device can communicate with a server to retrieve a document stored on the server. In another example, a client device can communicate with a server to upload a document to the server. In yet another example, a client device can communicate with a server to stream audio or video from the server.

In some instances, client devices can use multiple protocol stacks to communicate with the same server. A protocol stack is a set of communications protocols that work together to enable communication on a network. For example, a client device can use a protocol stack associated with the Web DAV protocol and a protocol stack associated with the File Transfer Protocol (FTP) to communicate with the same server.

Furthermore, in some instances where a client device uses multiple protocol stacks to communicate with the same server, the server requires each message from each of the protocol stacks to include a credential for a user of the client device. A credential is a set of information that includes identification and proof of identities that is used to gain access to a resource. Example types of credentials include usernames and passwords, certificates, biometric data, one-time passwords, and so on.

Each of the protocol stacks maintains a separate session state. When the protocol stacks detect that the server requires a credential, the protocol stacks prompt the user for the credential and store the credential as part of their respective session states. The protocol stacks can reuse this credential in later messages to the server. Consequently, the protocol stacks do not need to prompt the user for the credential each time the protocol stacks send messages to the server. However, each of the protocol stacks still needs to separately prompt the user to provide the credential. In other words, if the client device uses five protocol stacks to communicate with the server, five separate session states are maintained, and the user is prompted for the credential five separate times. Providing the credential multiple times can be annoying and/or confusing to the user.

SUMMARY

An application uses multiple protocol stacks to communicate with a server over a communications network. The server requires messages from each of the protocol stacks to include a credential for a user. Despite the fact that the server requires messages from each of the protocol stacks to include the credential, the user is not prompted for the credential more than once. This may improve the user experience of the application. In some embodiments, the credential is stored at the computing device for retrieval by the protocol stacks when the application uses the protocol stacks to communicate with the server. In this way, once the credential is stored at the client device, it may not be necessary to prompt the user for the credential again.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
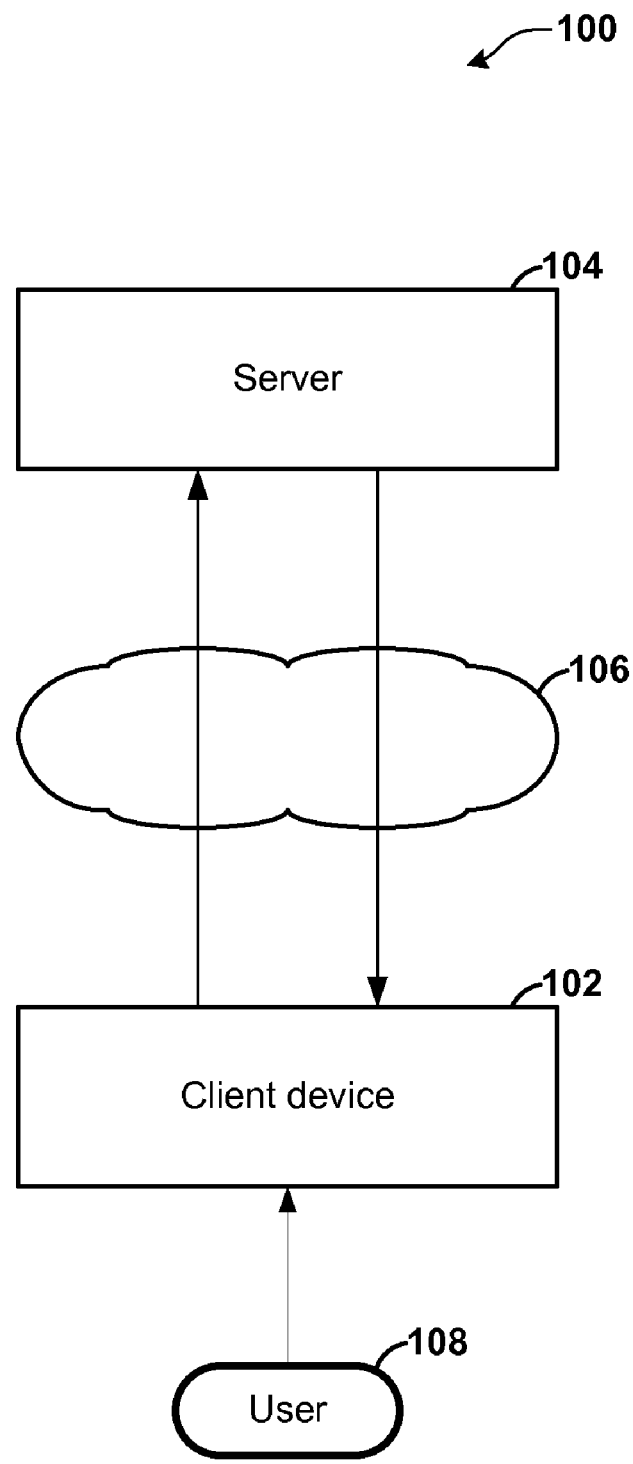
FIG. 1 is a block diagram illustrating an example system.

FIG. 1 is a block diagram illustrating an example system 100. As illustrated in the example system 100, the system 100 comprises a client device 102, a server 104, and a network 106. It should be appreciated that other embodiments can include devices, networks, systems, and so on in addition to those the system 100.

The server 104 is a computing system that stores documents. The server 104 can store various types of documents. For example, the server 104 can store word processor documents, spreadsheet documents, note documents, slide presentation documents, web page documents, desktop publishing documents, project design documents, diagram documents, image documents, and other types of documents. Some of the documents stored by the server 104 might contain information that should be kept secret from the general public.

A user 108 uses the client device 102 to retrieve and work on documents stored by the server 104. Furthermore, in some embodiments, the user 108 can use the client device 102 to create new documents and to store the new documents at the server 104. To help the user 108 retrieve, generate, and store documents, the client device 102 provides an application. For example, the client device 102 can provide a word processing application, such as the MICROSOFT® WORD word processing document, to help the user 108 retrieve, generate, and store word processor documents. In another example, the client device 102 can provide a spreadsheet application, such as the MICROSOFT® EXCEL® spreadsheet application, to help the user 108 retrieve, generate, and store spreadsheet documents. In other examples, the client device 102 can provide other types of applications, including note taking applications, slide presentation applications, web page design applications, desktop publishing applications, project design applications, diagram drawings applications, media editing applications, and so on.

To retrieve documents stored by the server 104 and to store documents to the server 104, the client device 102 communicates with the server 104 via the network 106. In particular, the application provided by the client device 102 uses multiple protocol stacks to communicate with the server 104. A protocol stack is a set of communications protocols that work together to enable communication on a network. A communications protocol is a set of rules or standards designed to enable computers to connect with one another and to exchange information. Example types of communications protocols include the Hypertext Transfer Protocol (HTTP), the File Transfer Protocol (FTP), the SOAP protocol, and so on.

To protect the documents stored by the server 104 from being accessed by people who do not have the right to access the documents, the server 104 can require messages from each of the protocol stacks to include a credential for the user 108. A credential is a set of information that includes identification and proof of identities that is used to gain access to a resource. Example types of credentials include usernames and passwords, certificates, biometric data, one-time passwords, and so on.

Although the server 104 can require messages from each of the protocol stacks to include a credential for the user 108, the client device 102 does not prompt the user 108 for a credential to use with the server 104 more than once. That is, the client device 102 may prompt the user 108 to provide a credential to use with the server 104 once, but the client device 102 does not need to prompt the user 108 for the same credential for each of the multiple protocol stacks used by the application to communicate with the server 104. The user 108 could find it annoying to provide the same credential multiple times. Consequently, not needing to prompt the user 108 for the same credential multiple times could improve the experience of using the application.

Figure 2:
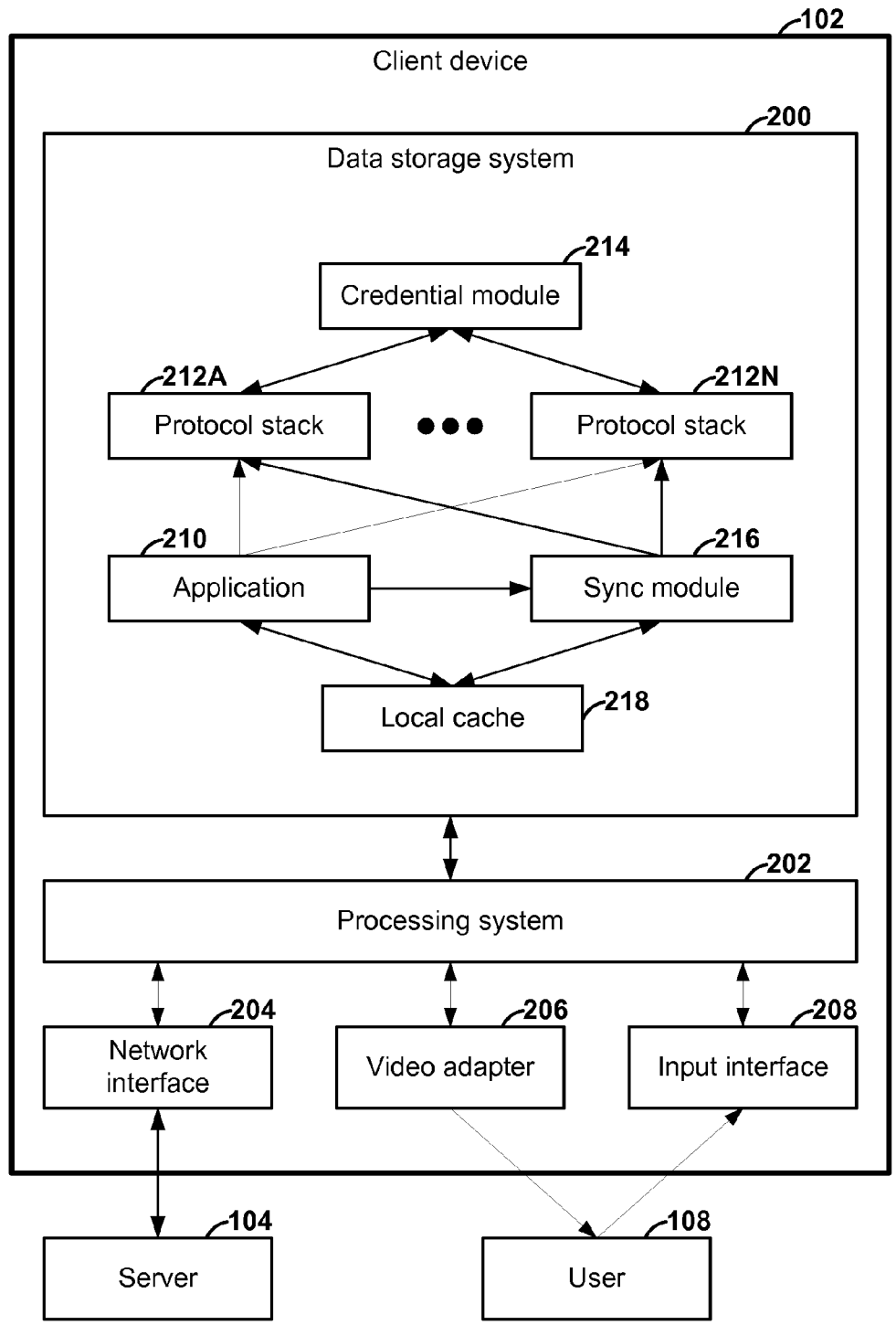
FIG. 2 is a block diagram illustrating example details of a client device in the system.

FIG. 2 is a block diagram illustrating example details of the client device 102. In various embodiments, the client device 102 can be a variety of different types of computing devices. For example, the client device 102 can be a desktop computer, a laptop computer, a smartphone, a handheld gaming device, a video gaming console, a computing device integrated into a vehicle, a tablet computer, or another type of computing device.

As illustrated in the example of FIG. 2, the client device 102 includes a data storage system 200, a processing system 202, a network interface 204, a video adapter 206, and an input interface 208. It should be appreciated that the client device 102 can contain many other devices, modules, systems, interfaces, and other components. Such other components are omitted from the example of FIG. 2 for the sake of clarity.

The data storage system 200 is a set of one or more computer storage media. A computer medium is a physical device or article of manufacture that is capable of storing computer-readable information. The processing system 202 is a system comprising one or more processing units. A processing unit is an integrated circuit or other type of device that executes computer-readable instructions. The network interface 204 is a component that enables the client device 102 to communicate with other computing devices via a network. The video adapter 206 is a component that enables the client device 102 to generate a video signal sent to a device (e.g., a monitor) that displays video represented by the video signal. The input interface 208 is a component that enables the user 108 to provide input to the client device 102. For example, the input interface 208 can be a component that enables the user 108 to provide keyboard and/or pointer input to the client device 102.

As illustrated in the example of FIG. 2, the data storage system 200 stores computer-readable instructions and/or other data that, when executed or otherwise used by the processing system 202, cause the client device 102 to provide an application 210, a set of protocol stacks 212A through 212N, a credential module 214, a sync module 216, and a local cache 218. The protocol stacks 212A through 212N are collectively referred to herein as the "protocol stacks 212." It should be appreciated that the data storage system 200 can store computer-readable instructions that, when executed by the processing system 202, cause the client device 102 to provide other functionality. Furthermore, it should be appreciated that the data storage system 200 can store data other than that illustrated in the example of FIG. 2.

In various embodiments, the application 210 can be various different types of applications. For example, the application 210 can be a word processing, a spreadsheet application, or another type of application.

Each of the protocol stacks 212 provides a software infrastructure for a different protocol stack. As also discussed elsewhere in this specification, a protocol stack is a set of communications protocols that work together to enable communication on a network. In various embodiments, the protocol stacks 212 provide the software infrastructure for protocol stacks that include various communications protocols. For example, the protocol stack 212A can provide a software infrastructure for a protocol stack that includes the Internet Protocol version 4 (IPv4) protocol, the Transmission Control Protocol (TCP), and HTTP. In this example, the protocol stack 212B (not shown) can provide a software infrastructure for a protocol stack that includes the Internet Protocol version 6 (IPv6), TCP, and HTTP. Furthermore, in this example, the protocol stack 212C (not shown) can provide a software infrastructure for a protocol stack that includes the Web DAV protocol and other protocols.

The protocol stacks 212 receive requests from the application 210 to send data. In response to such requests, the protocol stacks 212 use the network interface 204 to send requests to the server 104. If the server 104 requires a credential, the server 104 responds to the requests with messages that indicate that the server 104 requires a credential. When the protocol stacks 212 receive messages that indicate that the server 104 requires a credential, the protocol stacks 212 send requests for credentials to the credential module 214. The credential module 214 responds to such requests with the appropriate credentials for the server 104. Upon receiving the credentials from the credential module 214, the protocol stacks 212 use the credentials in subsequent requests to the server 104.

When the credential module 214 receives a request for a credential from one of the protocol stacks 212, the credential module 214 determines whether the credential is stored locally. If the credential is stored locally, the credential module 214 provides the credential to the protocol stack without prompting the user 108 to provide the credential. If the credential is not stored locally, the credential module 214 performs an operation to obtain the credential. After obtaining the credential, the credential module 214 stores the credential locally and copy the credential to the protocol stack.

When the application 210 obtains a copy of a document from the server 104 or generates a new document, the application 210 can store the document in the local cache 218. In some circumstances, the client device 102 can lose connectivity with the server 104 after the application 210 opens a document stored by the server 104. Furthermore, in such circumstances, the user 108 can close the document and/or the application 210. The document remains stored in the local cache 218. When the client device 102 regains connectivity with the server 104, the sync module 216 attempts to use credentials stored by the credential module 214 to synchronize a copy of the document stored in the local cache 218 with a version of the document stored at the server 104.

Although not illustrated in the example of FIG. 2, the client device 102 can provide multiple applications. For example, the client device 102 can provide a word processing application and a spreadsheet application. When the client device 102 provides multiple applications, the protocol stacks 212 can use the credential module 214 in response to requests from each of these applications. Consequently, if the credential module 214 contains a credential associated with the server 104 because of a communication between a first application and the server 104, one of the protocol stacks 212 can use this credential when communicating with the server 104 in response to a request from another application. As a result, if the user 108 provided a credential associated with the server 104 through one application provided by the client device 102, the user 108 might not need to provide the credential again through another application provided by the client device 102.

Figure 3:
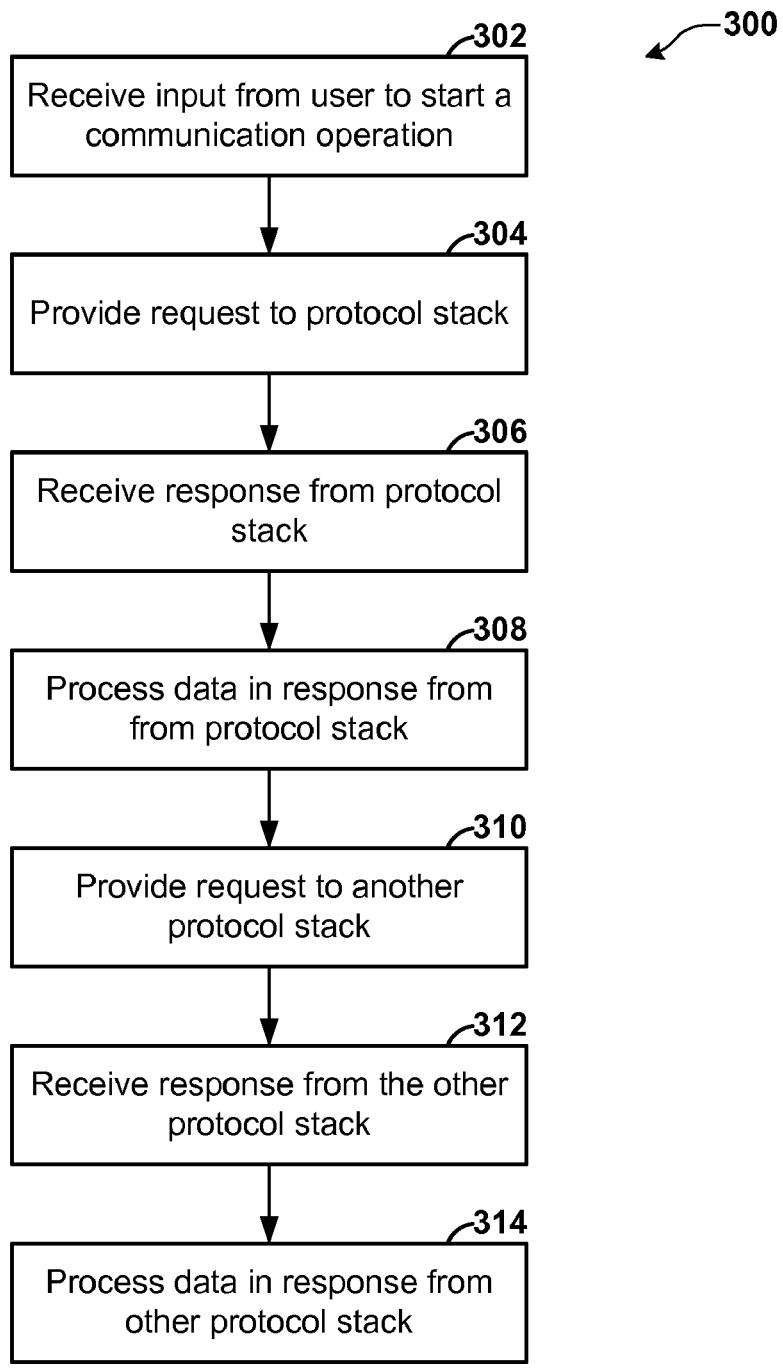
FIG. 3 is a flowchart illustrating an example operation of an application provided by the client device.

FIG. 3 is a flowchart illustrating an example operation 300 of the application 210. As illustrated in the example of FIG. 3, the operation 300 begins when the application 210 receives an input from the user 108 to start a communication operation that involves the use of multiple ones of the protocol stacks 212 (302). In various embodiments, the application 210 can receive input from the user 108 to start various types of communication operations. For example, the application 210 can receive input from the user 108 to start an open document dialog. During the open document dialog, the user 108 browses a set of folders and documents to select the document that the user 108 wants to open in the application 210. In another example, the application 210 can receive input from the user 108 to start a save-as dialog. During the save-as dialog, the user 108 browses a set of folders and documents to select a folder in which to save a document that is currently open in the application 210. In both of these examples, the application 210 uses multiple ones of the protocol stacks 212 to retrieve information about the server 104, to retrieve information about the folders, to retrieve information about the documents, to retrieve or store a copy of the document, and/or to perform other tasks.

In response to receiving the input from the user 108 to start the communication operation, the application 210 provides a request to one of the protocol stacks 212 (304). For ease of explanation, this specification assumes that the application 210 provides a request to the protocol stack 212A in step 304. The request provided to the protocol stack 212A requests the protocol stack 212A to send some information to the server 104. For example, the request provided to the protocol stack 212A can be a request to retrieve information about folders maintained by the server 104.

After providing the request to the protocol stack 212A, the application 210 receives a response from the protocol stack 212A (306). The response from the protocol stack 212A can include various types of data. For example, the response from the protocol stack 212A can include information about folders maintained by the server 104. The application 210 can then process the data in the response from the protocol stack 212A (308). The application 210 can process the data in the response from the protocol stack 212A in various ways. Continuing the previous example, the application 210 can process the data in the response from the protocol stack 212A by displaying the information about the folders maintained by the server 104 to the user 108.

The application 210 also sends a request to another one of the protocol stacks 212 (310). For ease of explanation, this specification assumes that the application 210 provides a request to the protocol stack 212B in step 310. The request provided to the protocol stack 212B requests the protocol stack 212B to send some information to the server 104. For example, the request provided to the protocol stack 212B can be a request to retrieve data about documents stored in a particular folder maintained by the server 104.

After providing the request to the protocol stack 212B, the application 210 receives a response from the protocol stack 212B (312). The response from the protocol stack 212B can include various types of data. For example, the response from the protocol stack 212B can include information about documents stored in a particular folder maintained by the server 104. The application 210 can then process the data in the response from the protocol stack 212B (314). The application 210 can process the data in the response from the protocol stack 212B in various ways. Continuing the previous example, the application 210 can process the data in the response from the protocol stack 212B by displaying the information about the documents in the particular folder to the user 108.

It should be appreciated that the operation 300 is merely an example. In other embodiments, the application 210 can perform more complex operations involving multiple ones of the protocol stacks 212. For example, the communication operation can be an operation to open a document stored by the server 104. In this example, the application 210 can use one of the protocol stacks 212 to send one or more Web DAV protocol requests to the server 104. The Web DAV protocol requests retrieve information that describes a folder hierarchy maintained by the server 104. The application 210 can then use another one of the protocol stacks 212 to send one or more Web View protocol requests to the server 104. The Web View protocol requests retrieve data about documents in a particular one of the folders. The application 210 can then use yet another one of the protocol stacks 212 to send one or more FPRPC protocol requests to the server 104. The FPRPC protocol requests retrieve metadata regarding a particular one of the documents. Next, the application 210 can use yet another one of the protocol stacks 212 to send one or more Web DAV protocol requests to the server 104. These Web DAV protocol requests retrieve a file from the server 104. In other embodiments, the application 210 uses a protocol stack to send one or more MS-FSSHTTP protocol requests to the server 104 to retrieve the document instead of the Web DAV protocol requests.

Figure 4:
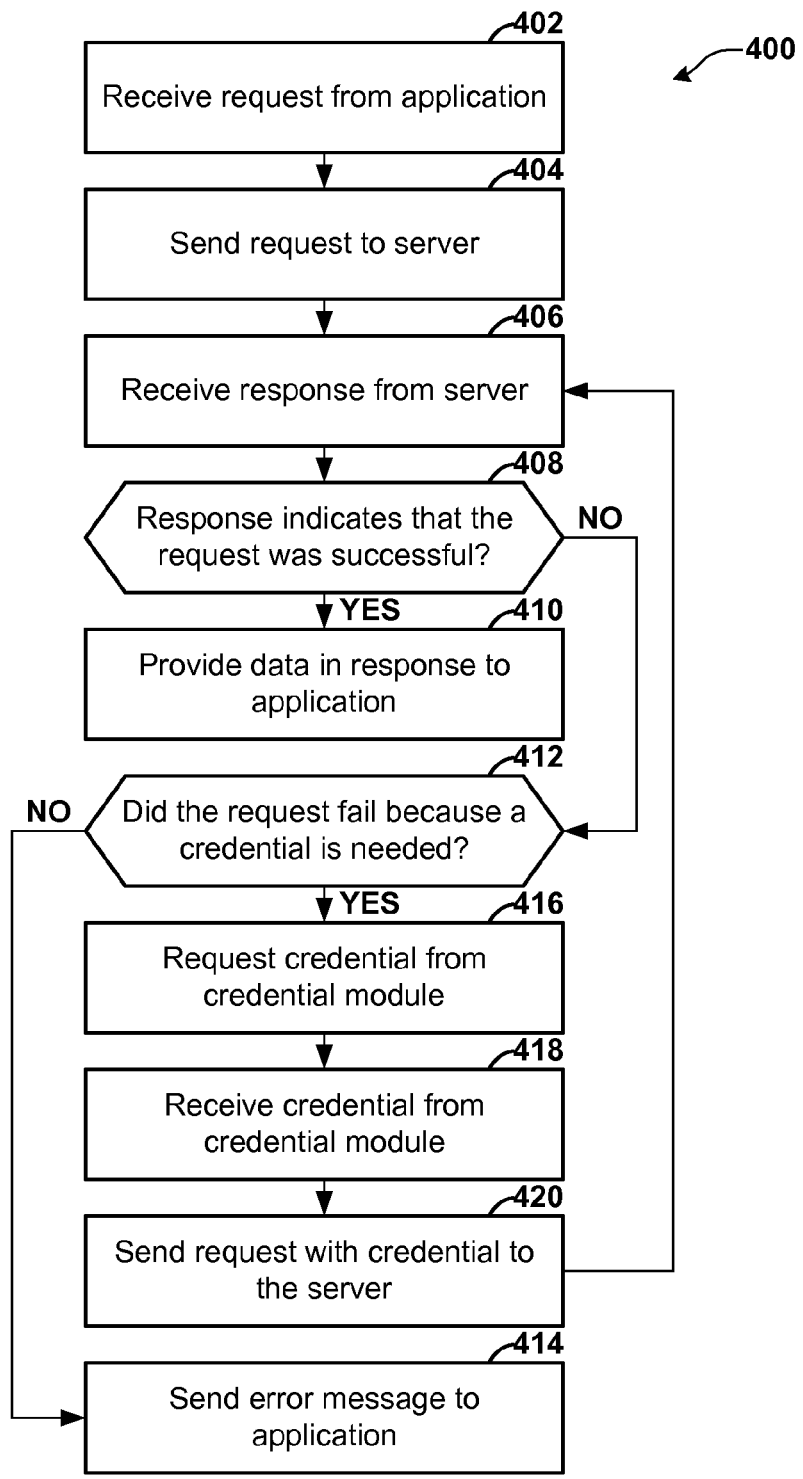
FIG. 4 is a flowchart illustrating an example operation of a protocol stack provided by the client device.

FIG. 4 is a flowchart illustrating an example operation 400 of the protocol stack 212A provided by the client device 102. Although the operation 400 is explained with regard to the protocol stack 212A, the operation 400 can be performed by other ones of the protocol stacks 212.

As illustrated in the example of FIG. 4, the operation 400 begins when the protocol stack 212A receives a request from the application 210 to send data to the server 104 (402). In various embodiments, the application 210 can receive the request from the application 210 in various ways. For example, in some embodiments, the application 210 can provide the request to the protocol stack 212A by invoking a method of an Application Programming Interface (API) provided by the protocol stack 212A, an operating system of the client device 102, or another component provided by the client device 102. In other embodiments, the application 210 can use a callback to provide the request to the protocol stack 212A.

After receiving the request from the application 210, the protocol stack 212A sends a request to the server 104 (404). In some cases, the request sent to the server 104 can include the data indicated by the application 210. In other cases, the request sent to the server 104 can be a request to set up a connection or session with the server 104 and might not contain the data indicated by the application 210.

After the protocol stack 212A sends the request to the server 104, the protocol stack 212A receives a response from the server 104 (406). The response is responsive to the request sent by the protocol stack 212A to the server 104. When the protocol stack 212A receives the response from the server 104, the protocol stack 212A determines whether the response indicates that the request was successful (408). If the protocol stack 212A determines that the response indicates that the request was successful ("YES" of 408), the protocol stack 212A can provide data in the response to the application 210 (410) and the operation 400 is complete. In other embodiments, when the response indicates that the request was successful, the protocol stack 212A and the server 104 can exchange one or more additional messages before the protocol stack 212A ultimately provides data to the application 210.

On the other hand, if the request was not successful ("NO" of 408), the protocol stack 212A determines whether the request failed because a credential was needed (412). Requests can fail for a variety of reasons. For example, a request can fail because the server 104 did not respond to the request, because a requested resource is not available on the server 104, or for other reasons. If the request failed, but not because a credential was needed ("NO" of 412), the protocol stack 212A sends an error message to the application 210 (414). For example, the protocol stack 212A can send an error message to the application 210 indicating that a requested resource does not exist at the server 104.

If the request was not successful because the server 104 requires a credential, the protocol stack 212A has detected that the server 104 requires the credential. Hence, if the request was not successful because a credential was needed ("YES" of 412), the protocol stack 212A provides a request for the credential to the credential module 214 (416). The request for the credential includes a server name of the server 104 or the server 104 is otherwise identified to the credential module 214 when the protocol stack 212A provides the request for the credential to the credential module 214.

In various embodiments, the protocol stack 212A provides the request for the credential to the credential module 214 in various ways. For example, in some cases, the protocol stack 212A provides the request to the credential module 214 by invoking one or more methods of an API provided by the credential module 214, the operating system of the client device 102, or another component provided by the client device 102. In other cases, the credential module 214 registers a callback with the protocol stack 212A when the credential module 214 is initialized. In such embodiments, the protocol stack 212A uses the callback to provide the request for the credential to the credential module 214. Furthermore, in some embodiments, different ones of the protocol stacks 212 can provide the requests to the credential module 214 in different ways. For example, one of the protocol stacks 212 associated with the HTTP protocol can use an API to provide requests to the credential module 214 and one of the protocol stacks 212 associated with the Web DAV protocol can use the callback technique to provide requests to the credential module 214.

Subsequently, the protocol stack 212A receives a credential from the credential module 214 (418). After receiving the credential from the credential module 214, the protocol stack 212A sends a request with the credential to the server 104 (420). This request can be the same type or a different type of request than the request initially sent in step 404. After sending the request with the credential, the protocol stack 212A receives another response from the server 104 (406) and the protocol stack 212A can repeat the subsequent steps.

Figure 5:
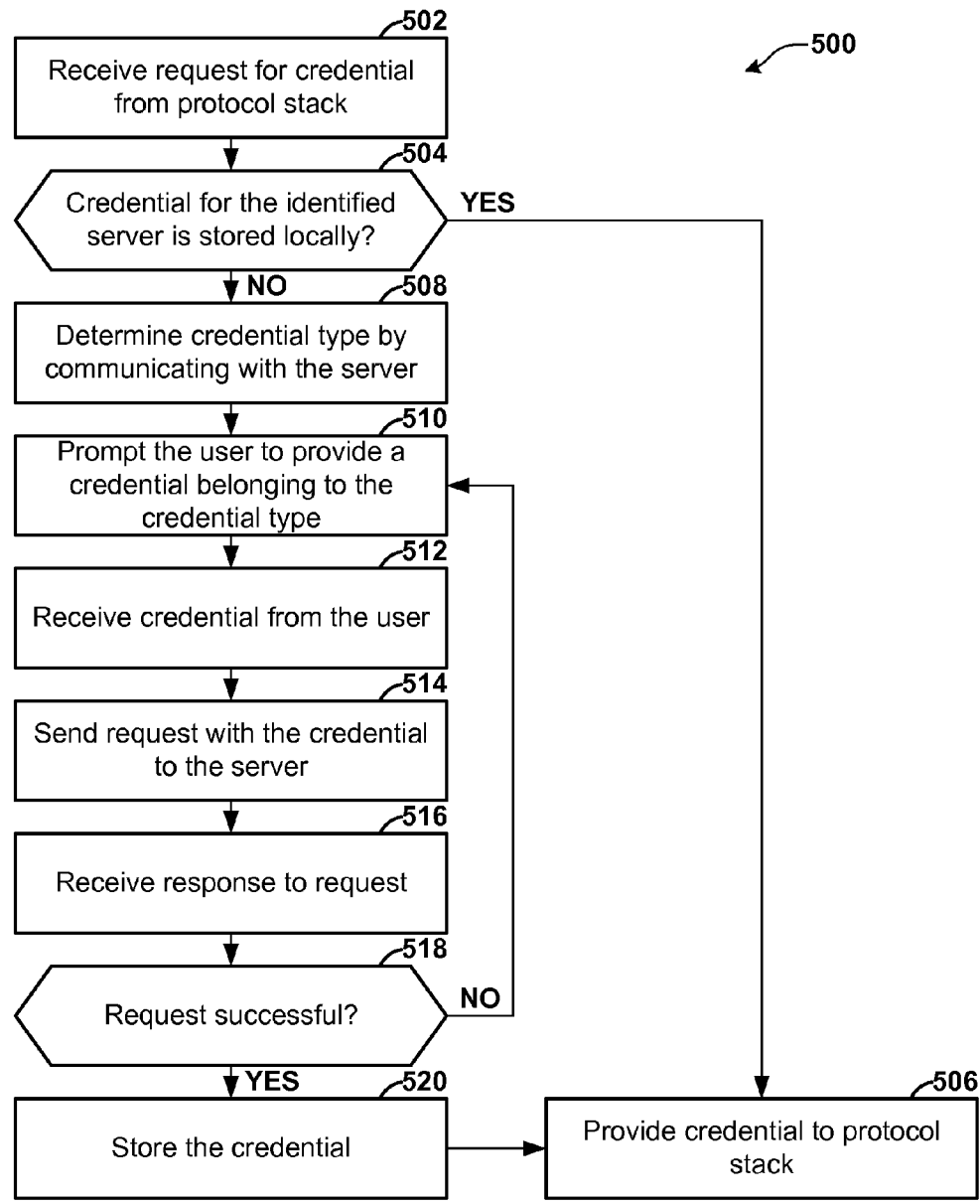
FIG. 5 is a flowchart illustrating an example operation of a credential module provided by the client device.

FIG. 5 is a flowchart illustrating an example operation 500 of the credential module 214 provided by the client device 102. As illustrated in the example of FIG. 5, the operation 500 begins when the credential module 214 receives a request for a credential from one of the protocol stacks 212 (502). When the credential module 214 receives a request for a credential, the credential module 214 also receives information that identifies a server on which the protocol stack will use the credential. In various embodiments, the credential module 214 receives information that identifies the server in various ways. For example, request for the credential can include a Uniform Resource Identifier (URI) or a Uniform Resource Locator (URL) of the server on which the protocol stack will use the credential. In this example, the URI or URL can specify a protocol, a port number, and/or other information about the server in addition to a domain name and path at the server. For ease of explanation, it is assumed in this description of FIG. 5 that the identified server is the server 104.

In response to receiving the request for a credential, the credential module 214 determines whether the credential module 214 has stored a credential for the server 104 (504). In various embodiments, the credential module 214 determines whether a credential has been stored for the server 104 in various ways. For example, the credential module 214 can maintain a mapping data structure, such as a hash table, that maps the URIs of servers to credentials for the servers. If the credential module 214 determines that the credential module 214 has stored a credential for the server 104 ("YES" of 504), the credential module 214 provides the credential for the server 104 to the protocol stack (506).

Figure 6:
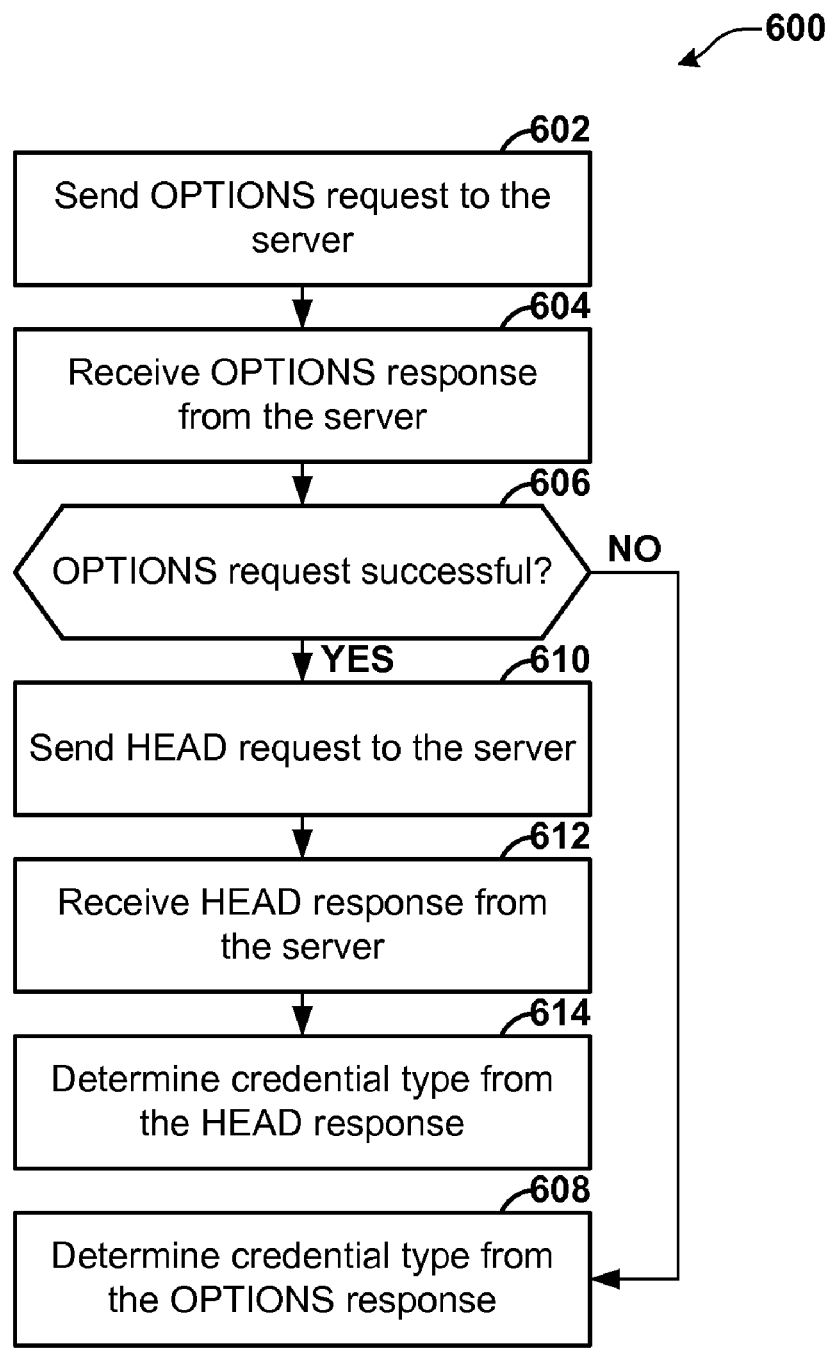
FIG. 6 is a flowchart illustrating an example operation of the credential module to determine a credential type requested by a server.

On the other hand, if the credential module 214 determines that the credential module 214 has not stored a credential for the server 104 ("NO" of 504), the credential module 214 determines a credential type utilized by the server 104 by communicating with the server 104 (508). In various embodiments, the credential module 214 can determine the credential type utilized by the server 104 in various ways. For instance, FIG. 6 illustrates one example operation to determine the credential type utilized by the server 104. FIG. 6 is described in detail elsewhere in this specification. It should be appreciated that the credential module 214 can use operations other than that illustrated in the example of FIG. 6 to determine the credential type utilized by the server 104.

After determining the credential type utilized by the server 104, the credential module 214 prompts the user 108 to provide a credential belonging to the credential type (510). After the credential module 214 prompts the user 108 to provide the credential, the credential module 214 receives a credential from the user 108 (512). The credential module 214 can prompt the user 108 to provide a credential in various ways. For example, if the credential utilized by the server 104 is a username and password, the credential module 214 can use the video adapter 206 to display a dialog box that has a field for a username and a field for a password. In another example, if the credential utilized by the server 104 is a certificate/password combination, the credential module 214 can use the video adapter 206 to display a dialog box for selecting a certificate from a file system and another dialog box that has a field for entering a password associated with the certificate. In yet another example, if the credential utilized by the server 104 is a fingerprint, the credential module 214 can use the video adapter 206 to prompt the user 108 to swipe his or her finger over a fingerprint reader.

After the credential module 214 receives the credential from the user 108, the credential module 214 sends a request with the credential to the server 104 (514). In various embodiments, the credential module 214 can send various requests with the credential to the server 104. For example, in some embodiments, the credential module 214 can send HTTP HEAD or HTTP OPTIONS requests to the server 104. In this example, the HTTP HEAD or HTTP OPTIONS requests include the credential in headers in these requests. In other embodiments, other types of requests are used.

After sending the request with the credential to the server 104, the credential module 214 receives a response from the server 104 (516). The credential module 214 then uses the response to determine whether the request was successful (518). The request is successful if the server 104 successfully validated the credential. If the request was not successful ("NO" of 518), the credential module 214 prompts the user 108 to provide a credential again (510). The credential module 214 can continue prompting the user 108 to provide credentials until the user 108 provides a credential that the server 104 successfully validates or until the user 108 quits.

If the credential module 214 determines that the request was successful ("YES" of 518), the credential module 214 stores the credential (520). The credential module 214 stores the credential such that the credential module 214 can retrieve the credential when provided with information that identifies of the server 104. After storing the credential, the credential module 214 provides the credential to the protocol stack (506). The credential module 214 can repeat the operation 500 each time the credential module 214 receives a request from one of the protocol stacks 212 for a credential.

In some circumstances, one or more proxy servers can exist on a network route between the client device 102 and the server 104. A proxy server is a computer that acts as a barrier between a network and another network by presenting only a single network address to external sites. In some instances, proxy servers require credentials from users in order to allow messages from the users to flow through the proxy servers. The credential module 214 can automatically repeat the operation 500 for each proxy server on a network route between the client device 102 and the server 104. This can save the user 108 the trouble of providing credentials to the proxy servers for each of the protocol stacks used by the application 210 to communicate with the server 104.

FIG. 6 is a flowchart illustrating an example operation 600 of the credential module 214 to determine a credential type requested by a server. As illustrated in the example of FIG. 6, the credential module 214 first sends an HTTP OPTIONS request to the server 104 (602). The Internet Engineering Taskforce (IETF) RFC 2616 defines the HTTP OPTIONS request. The OPTIONS request represents a request for information about the communications options available on a request/response chain identified by a request URI in the OPTIONS request. In other words, the OPTIONS request allows the client to determine the options and/or requirements associated with a resource, or the capabilities of a server, without implying a resource action or initiating a resource retrieval.

After sending the OPTIONS request, the credential module 214 receives an OPTIONS response (604). The OPTIONS response is responsive to the OPTIONS request. After the credential module 214 receives the OPTIONS response, the credential module 214 determines whether the OPTIONS response indicates that the OPTIONS request was successful (606).

If the OPTIONS request was successful, the OPTIONS response includes information about the communications options available on the server 104. Some servers do not require any authentication in order to provide a successful response to an OPTIONS request, but do require authentication for other types of requests. Consequently, if the OPTIONS request was successful, the OPTIONS response does not necessarily include information about a credential type requested by the server 104. If the OPTIONS request is not successful, the OPTIONS response can include information indicating the credential type requested by the server 104. Hence, if the OPTIONS request is not successful ("NO" of 606), the server 104 determines the credential type requested by the server 104 from the OPTIONS response (608).

On the other hand, if the OPTIONS response is successful ("YES" of 606), the credential module 214 sends an HTTP HEAD request to the server 104 (610). The HEAD request specifies a resource hosted by the server 104. The IETF RFC 2616 defines the HEAD request. The HEAD request can be used for obtaining metadata about a resource indicated by the HEAD request without transferring the body of the resource to the client. After sending the HEAD request, the credential module 214 receives a HEAD response from the server 104 (612). Typically, if a server requests a credential to access a resource, the server does generate a successful HEAD response without such a credential. Hence, the HEAD response indicates that the HEAD response was not successful and includes information that indicates a credential type requested by the server 104. Thus, when the credential module 214 receives the HEAD response, the credential module 214 determines the credential type for the server 104 from the HEAD response (614).

Figure 7:
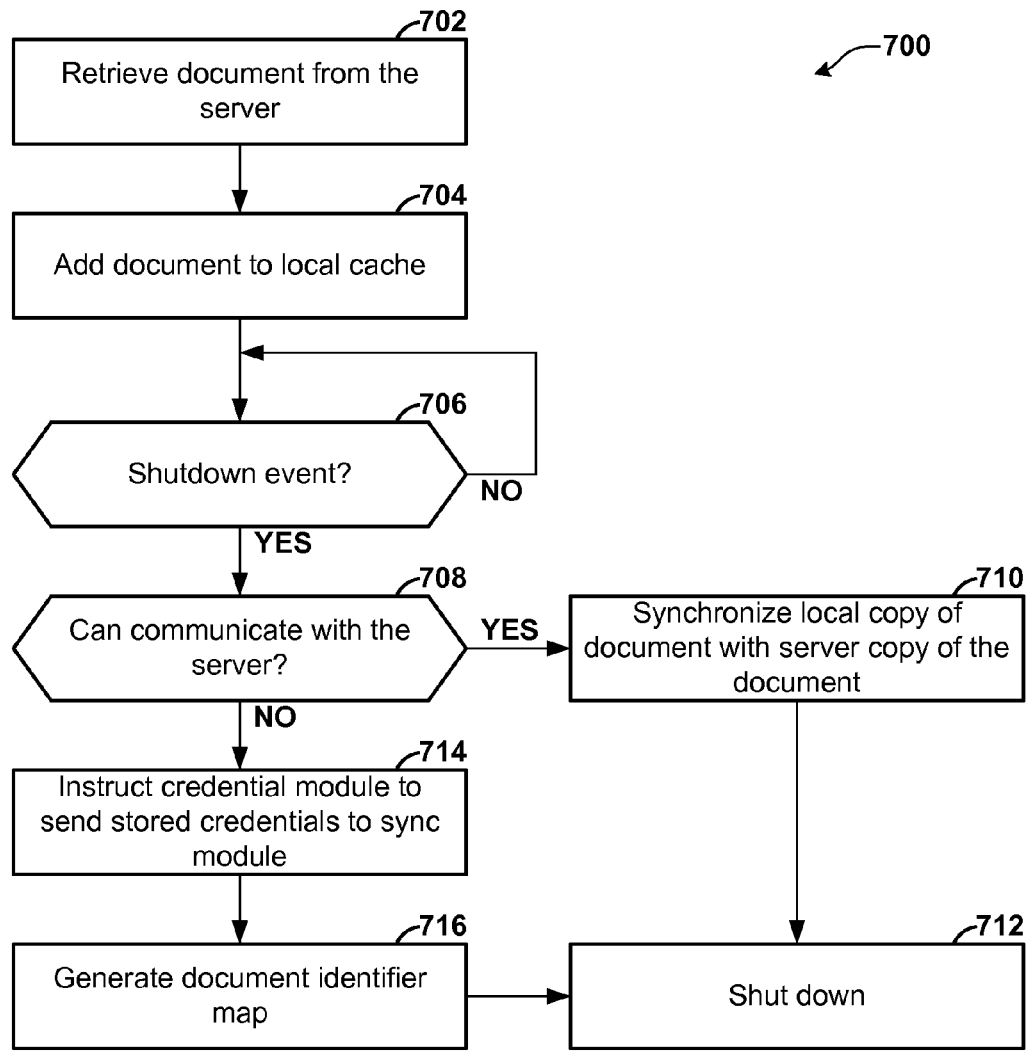
FIG. 7 is a flowchart illustrating a further operation of the application.

FIG. 7 is a flowchart illustrating a further operation 700 of the application 210. As illustrated in the example of FIG. 7, the application 210 first retrieves a document from the server 104 (702). After retrieving the document from the server 104, the application 210 adds the document to the local cache 218 at the client device 102 (704). The copy of the document stored in the local cache 218 is referred to herein as the local copy of the document. The server copy of the document is the copy of the document stored at the server 104. After the application 210 adds the local copy to the local cache 218, the user 108 can view or edit the local copy of the document.

Subsequently, the application 210 determines whether the application 210 has received a shutdown event (706). The shutdown event is an event that instructs the application 210 to shut down. The application 210 can receive the shutdown event in a variety of circumstances. For example, the application 210 can receive the shutdown event when the user 108 provides input that instructs the application 210 to shut down. In another example, the application 210 receives the shutdown event when the client device 102 is preparing to shut down. If the application 210 has not received input from the user 108 to close the application 210 ("NO" of 706), the application 210 can perform one or more other tasks before eventually determining again whether the application 210 has received input from the user 108 to close the application 210 (706).

If the application 210 has received a shutdown event ("YES" of 706), the application 210 determines whether the client device 102 is able to communicate with the server 104 (708). If the application 210 determines that the client device 102 is able to communicate with the server 104 ("YES" of 708), the application 210 communicates with the server 104 to synchronize the local copy of the document with the corresponding server copy of the document (710). In various embodiments, the application 210 can synchronize the local copy of the document with the server copy of the document in various ways. For example, the application 210 can synchronize the copies of the document by sending the complete local copy of the document to the server 104. In another example, the application 210 can synchronize the copies of the document by sending to the server 104 data that represents changes made to the local copy of the document. In this example, the server 104 applies these changes to the server copy of the document to update the server copy of the document.

After synchronizing the local copy of the document with the corresponding server copy of the document, the application 210 shuts down (712). In some embodiments, the credential module 214 also shuts down when the application 210 shuts down. Furthermore, in some embodiments, the application 210 removes the local copy of the document from the local cache 218 after synchronizing the local copy of the document with the corresponding service copy of the document. In other embodiments, the local copy of the document remains in the local cache 218 after the application 210 shuts down.

On the other hand, if the application 210 is not able to communicate with the server 104 ("NO" of 708), the application 210 instructs the credential module 214 to send a credential for the server 104 to the sync module 216 (714). In this way, the sync module 216 receives the credential that the sync module 216 can later use to synchronize the local copy of the document with the server copy of the document. In addition, the application 210 generates a document identifier map (716). The document identifier map is a data structure that maps an identifier of the local copy of the document to an identifier of the server copy of the document. For example, the document identifier map can map a file system path name for the local copy of the document to a URL of the server copy of the document. The sync module 216 uses such document identifier maps when synchronizing local copies of documents with server copies of the documents. At some time after generating the document reference map, the application 210 shuts down (712).

Figure 8:
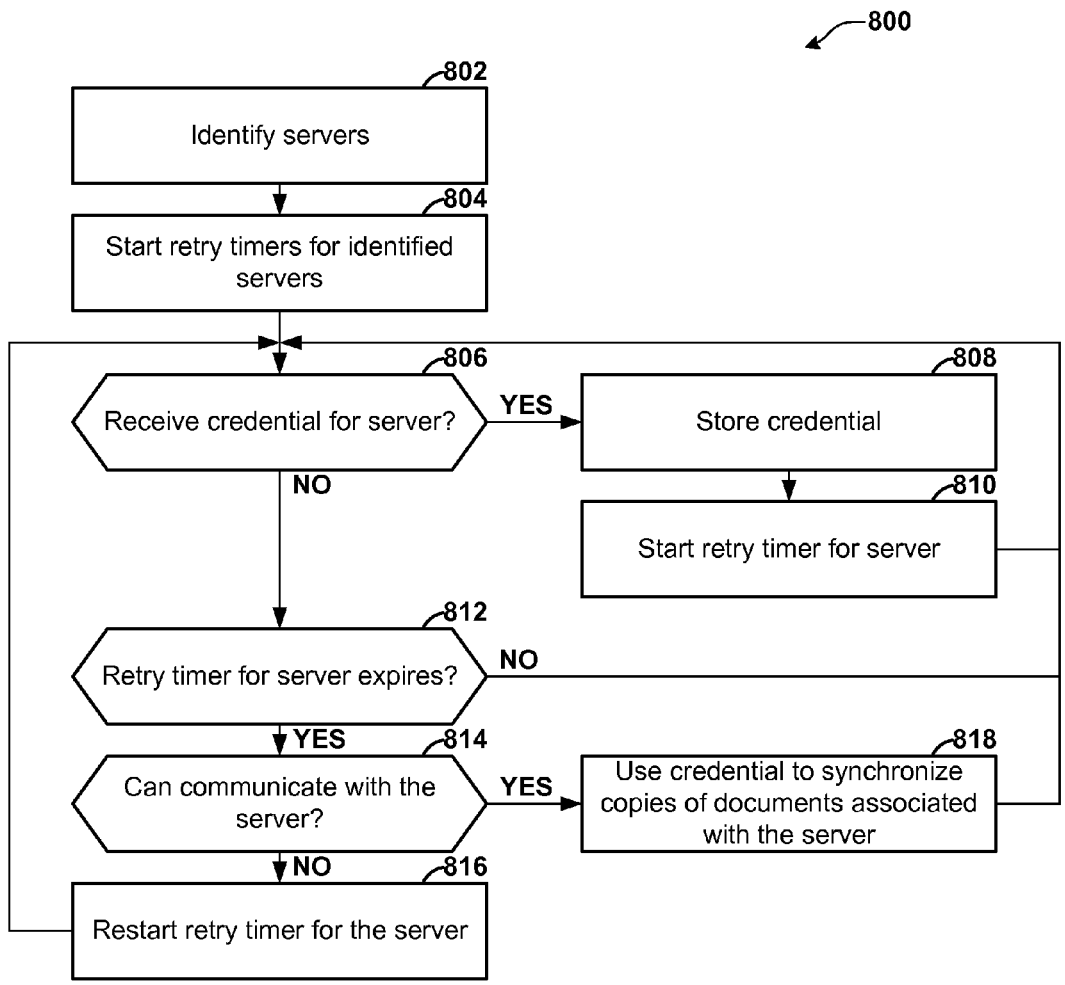
FIG. 8 is a flowchart illustrating an operation of a sync module provided by the client device.

FIG. 8 is a flowchart illustrating an operation 800 of the sync module 216 provided by the client device 102. As described briefly above, the sync module 216 is, in some embodiments, a process that operates in the background and does not require user interaction. The sync module 216 does not terminate when the application 210 closes. Furthermore, the sync module 216 can start automatically when the client device 102 starts or can start in response to other events.

When the sync module 216 starts, the sync module 216 identifies servers that are associated with documents in the local cache 218 and for which the sync module 216 has credentials (802). The sync module 216 then starts retry timers for at least some of the identified servers (804). The retry timers generate events when particular time periods expire. For example, a retry timer can generate an event when ten minutes expire. In another example, a retry timer can generate an event when five minutes expire.

After starting the retry timers, the sync module 216 enters a processing loop in which the sync module 216 responds to events. As illustrated in the example of FIG. 8, the sync module 216 first determines whether the sync module 216 has received a credential for a server from the credential module 214 (806). The credential module 214 can provide the credential to the sync module 216 when the application 210 shuts down. If the sync module 216 receives a credential for a server ("YES" of 806), the sync module 216 stores the credential for the server (808). The sync module 216 then starts a retry timer for the server (810).

Else, if the sync module 216 did not receive a credential ("NO" of 806), the sync module 216 determines whether a retry timer for a server expired (812). If no retry timer for the server expired ("NO" of 812), the sync module 216 can wait for another event and repeat the processing loop. On the other hand, if a retry timer for a server expired ("YES" of 812), the sync module 216 determines whether the client device 102 is able to communicate with the server (814). In various embodiments, the sync module 216 determines whether the client device 102 is able to communicate with the server in various ways. For example, the sync module 216 can determine whether the client device 102 is able to communicate with the server by sending HTTP HEAD or OPTIONS requests to the server. If the sync module 216 is not able to communicate with the server ("NO" of 814), the sync module 216 restarts the retry timer for the server (816). After restarting the retry timer for the server, the sync module 216 can repeat the processing loop when the sync module 216 receives another event. If the sync module 216 is able to communicate with the server ("YES" of 814), the sync module 216 uses the credential stored by the sync module 216 to synchronize local copies of documents associated with the server with corresponding server copies of the documents (818). The sync module 216 can use document identifier maps to identify server copies of documents that correspond to the local copies of documents.

Figure 9:
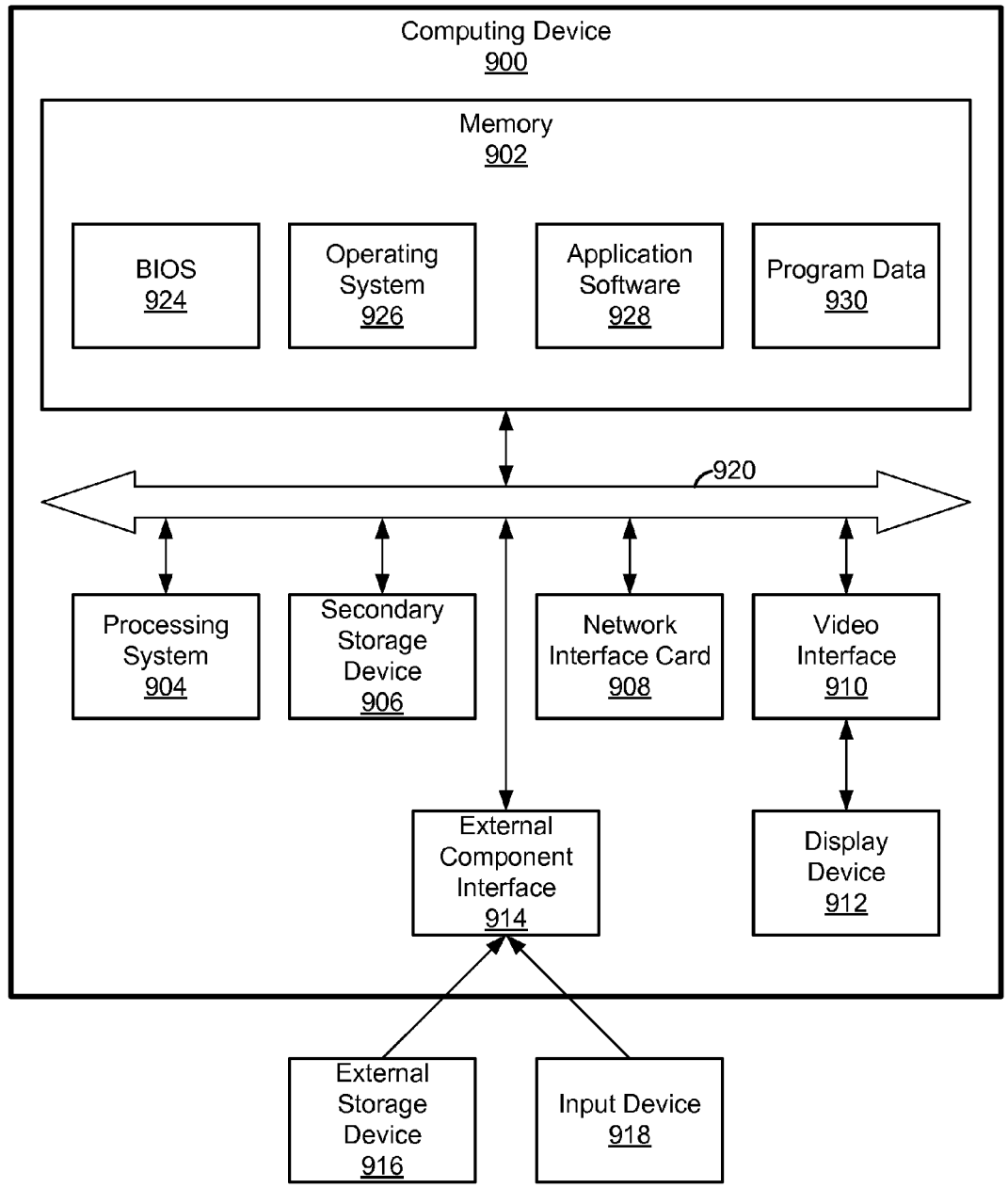
FIG. 9 is a block diagram illustrating an example computing device.

FIG. 9 is a block diagram illustrating an example computing device 900. In some embodiments, the client device 102 and the server 104 are implemented using one or more computing devices like the computing device 900. It should be appreciated that in other embodiments, the client device 102 and the server 104 are implemented using computing devices having hardware components other than those illustrated in the example of FIG. 9.

A computing system is a system comprising one or more computing devices. A computing device is a physical device that is capable of processing information. Example types of computing devices include desktop computers, laptop computers, standalone server computers, blade server computers, mobile telephones, personal media players, video game consoles, computers integrated into vehicles, television set top boxes, intermediate network devices, and other types of physical devices that are capable of processing information.

In different embodiments, computing devices are implemented in different ways. For instance, in the example of FIG. 9, the computing device 900 comprises a memory 902, a processing system 904, a secondary storage device 906, a network interface card 908, a video interface 910, a display device 912, an external component interface 914, an external storage device 916, an input device 918, and a communication medium 920. In other embodiments, computing devices are implemented using more or fewer hardware components. For instance, in another example embodiment, a computing device does not include a video interface, a display device, an external storage device, or an input device.

The term computer readable media as used herein may include computer storage media. Computer storage media may include volatile and nonvolatile, removable and non-removable media implemented in any method or technology for storage of information, such as computer readable instructions, data structures, program modules, or other data. The memory 902 includes one or more computer storage media capable of storing data and/or instructions. As used in this document, a computer storage medium is a device or article of manufacture that stores data and/or software instructions readable by a computing device. In different embodiments, the memory 902 is implemented in different ways. For instance, in various embodiments, the memory 902 is implemented using various types of computer storage media. Example types of computer storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The processing system 904 is a system comprising one or more processing units. Processing units include one or more physical integrated circuits that selectively execute software instructions. In various embodiments, the processing system 904 is implemented in various ways. For instance, in one example embodiment, the processing system 904 is implemented as one or more processing cores. For instance, in this example embodiment, the processing system 904 may be implemented as one or more Intel Core 2 microprocessors. In another example embodiment, the processing system 904 is implemented as one or more separate microprocessors. In yet another example embodiment, the processing system 904 is implemented as an ASIC that provides specific functionality. In yet another example embodiment, the processing system 904 provides specific functionality by using an ASIC and by executing software instructions.

In different embodiments, the processing system 904 executes software instructions in different instruction sets. For instance, in various embodiments, the processing system 904 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 906 includes one or more computer-readable data storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 is implemented by various types of computer-readable data storage media. For instance, the secondary storage device 906 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 908 enables the computing device 900 to send data to and receive data from a computer communication network. In different embodiments, the network interface card 908 is implemented in different ways. For example, in various embodiments, the network interface card 908 is implemented as an Ethernet interface, a token-ring network interface, a fiber optic network interface, a wireless network interface (e.g., WiFi, WiMax, etc.), or another type of network interface.

The video interface 910 enables the computing device 900 to output video information to the display device 912. In different embodiments, the video interface 910 is implemented in different ways. For instance, in one example embodiment, the video interface 910 is integrated into a motherboard of the computing device 900. In another example embodiment, the video interface 910 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 912 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 910 communicates with the display device 912 in various ways. For instance, in various embodiments, the video interface 910 communicates with the display device 912 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 914 enables the computing device 900 to communicate with external devices. In various embodiments, the external component interface 914 is implemented in different ways. For instance, in one example embodiment, the external component interface 914 is a USB interface. In other example embodiments, the computing device 900 is a FireWire interface, a serial port interface, a parallel port interface, a PS/2 interface, and/or another type of interface that enables the computing device 900 to communicate with external components.

In different embodiments, the external component interface 914 enables the computing device 900 to communicate with different external components. For instance, in the example of FIG. 9, the external component interface 914 enables the computing device 900 to communicate with the external storage device 916, and the input device 918. In other embodiments, the external component interface 914 enables the computing device 900 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 900.

The external storage device 916 is an external component comprising one or more computer readable data storage media. Different implementations of the computing device 900 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 918 is an external component that provides user input to the computing device 900. Different implementations of the computing device 900 interface with different types of input devices. Example types of input devices include, but are not limited to, keyboards, mice, trackballs, stylus input devices, key pads, microphones, joysticks, touch-sensitive display screens, and other types of devices that provide user input to the computing device 900.

The communications medium 920 facilitates communication among the hardware components of the computing device 900. In different embodiments, the communications medium 920 facilitates communication among different components of the computing device 900. For instance, in the example of FIG. 9, the communications medium 920 facilitates communication among the memory 902, the processing system 904, the secondary storage device 906, the network interface card 908, the video interface 910, and the external component interface 914. In different implementations of the computing device 900, the communications medium 920 is implemented in different ways. For instance, in different implementations of the computing device 900, the communications medium 920 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 924, an operating system 926, application software 928, and program data 930. The BIOS 924 includes a set of software instructions that, when executed by the processing system 904, cause the computing device 900 to boot up. The operating system 926 includes a set of software instructions that, when executed by the processing system 904, cause the computing device 900 to provide an operating system that coordinates the activities and sharing of resources of the computing device 900. Example types of operating systems include, but are not limited to, MICROSOFT® WINDOWS®, Linux, Unix, Apple OS X, Apple OS X iPhone, Palm webOS, Palm OS, Google Chrome OS, Google Android OS, and so on. The application software 928 includes a set of software instructions that, when executed by the processing system 904, cause the computing device 900 to provide applications to a user of the computing device 900. The program data 930 is data generated and/or used by the application software 928.

The various embodiments described above are provided by way of illustration only and should not be construed as limiting. Those skilled in the art will readily recognize various modifications and changes that may be made without following the example embodiments and applications illustrated and described herein. For example, the embodiments have been described with regard to a document. However, other embodiments apply the techniques described in this specification to other types of hierarchical data structures. Furthermore, the operations shown in the figures are merely examples. In various embodiments, similar operations can include more or fewer steps than those shown in the figures. Furthermore, in other embodiments, similar operations can include the steps of the operations shown in the figures in different orders.

We claim:

1. A method comprising:
providing a computing device; and
providing, by the computing device, an application that uses multiple protocol stacks to communicate with a server that requires messages from each of the multiple protocol stacks to include a credential for a user, without prompting the user for the credential more than once, wherein each of the multiple protocol stacks performs a number of actions when the application uses the multiple protocol stacks to communicate with the server including:
   determining whether the credential is stored at the computing device; and
   providing the credential to the server without prompting the user for the credential when the credential is stored at the computing device; and
   performing a number of actions when the credential is not stored at the computing device including:
      communicating with the server to determine a type of credential required;
      prompting the user for the credential;
      receiving the credential from the user;
      storing the credential at the computing device in a manner that enables the credential to be identified based on a name of the server; and
      providing the credential to the server.

2. The method of claim 1, wherein the application uses the multiple protocol stacks to communicate with the server during an open document dialog with the user.

3. The method of claim 1, wherein the application uses the multiple protocol stacks to communicate with the server during a save-as dialog with the user.

4. The method of claim 1, further comprising
providing the credential to the multiple protocol stacks when the application uses the multiple protocol stacks to communicate with the server.

5. The method of claim 4, further comprising:
detecting, by the multiple protocol stacks, whether the server requires the credential; and
requesting, by the multiple protocol stacks, the credential when the protocol stacks detect that the server requires the credential.

6. The method of claim 1, wherein storing the credential comprises storing the credential at least until the application closes.

7. The method of claim 1, wherein prompting the user for the credential comprises: after determining the type of credential required by the server, prompting the user for the credential of the type required by the server.

8. The method of claim 7, wherein communicating with the server to determine the type of credential required by the server comprises:
sending a HTTP OPTIONS request to the server;
receiving a HTTP OPTIONS response from the server;
determining whether the OPTIONS response indicates that the OPTIONS request was successful;
use the OPTIONS response to determine the type of credential required by the server when the OPTIONS request was not successful;
sending a HTTP HEAD request to the server when the OPTIONS request was successful;
receiving a HTTP HEAD response from the server; and
use the HEAD response to determine the type of credential required by the server.

9. The method of claim 1, further comprising: after the application closes, using the credential to synchronize a local copy of a document with a copy of the document stored at the server without prompting the user for the credential.

10. The method of claim 1, wherein the application is one of: a word processing application, a spreadsheet application, a note taking application, a slide presentation application, or a desktop publishing application.

11. The method of claim 1,
wherein the application is a first application; and
wherein the method further comprises: providing, by the computing device, a second application that uses a given protocol stack to communicate with the server, the server requiring the given protocol stack to provide the credential, the user not being prompted for the credential when the second application uses the given protocol stack to communicate with the server when the user has already provided the credential while using the first application.

12. A computing device comprising:
a processing system; and
a data storage system that stores computer-readable instructions that, when executed, cause the computing device to provide an application that uses multiple protocol stacks to communicate with a server that requires messages from each of the multiple protocol stacks to include a credential for a user of the computing device, the user not being prompted for the credential more than once, wherein each of the multiple protocol stacks performs a number of actions when the application uses the multiple protocol stacks to communicate with the server, the number of actions operable to:
  determine whether the credential is stored at the computing device;
  provide the credential to the server without prompting the user for the credential when the credential is stored at the computing device; and
  perform the following actions when the credential is not stored at the computing device:
    communicate with the server to determine a type of credential required by the server;
    after determining the type of credential required by the server, prompt the user for a credential of the type required by the server;
    receive the credential from the user;
    store the credential of the required type at the computing device in a manner that enables the credential to be identified based on a name of the server; and
    provide the credential to the server.

13. The computing device of claim 12, wherein the data storage system stores computer-readable instructions that, when executed, cause the computing device to detect whether the server requires the credential.

14. The computing device of claim 12, wherein determining the type of credential required by the server comprises:
sending a HTTP OPTIONS request to the server;
receiving a HTTP OPTIONS response from the server;
determining whether the OPTIONS response indicates that the OPTIONS request was successful;
use the OPTIONS response to determine the type of credential required by the server when the OPTIONS request was not successful;
sending a HTTP HEAD request to the server when the OPTIONS request was successful;
receiving a HTTP HEAD response from the server; and
use the HEAD response to determine the type of credential required by the server.

15. The computing device of claim 12, wherein the data storage system stores computer-readable instructions that, when executed by the processing system, cause the computing device to use, after the application closes, the credential to synchronize a local copy of a document with a copy of the document stored at the server without prompting the user for the credential.

16. The computing device of claim 12,
wherein the application is a first application; and
wherein the data storage system further comprises computer-readable instructions that, when executed by the processing system, cause the computing device to provide a second application that uses a given protocol stack to communicate with the server, the server requiring messages from the given protocol stack to include the credential, the user not being prompted for the credential when the second application uses the given protocol stack to communicate with the server when the user has already provided the credential while using the first application.

17. A computer-readable storage device which stores computer-readable instructions that, when executed by a computing device, cause the computing device to:
provide multiple protocol stacks;
provide an application that uses the multiple protocol stacks to communicate with a server that requires messages from each of the multiple protocol stacks to include a credential for a user of the computing device, wherein each of the multiple protocol stacks performs the following actions when the application uses the multiple protocol stacks to communicate with the server:
  determine whether the credential is stored at the computing device; and
  provide the credential to the server without prompting the user for the credential when the credential is stored at the computing device; and
  perform the following actions when the credential is not stored at the computing device:
    communicate with the server to determine a type of credential required by the server;
    prompt the user for the credential when the credential is not stored at the computing device;
    receive the credential from the user;
    store the credential at the computing device in a manner that enables the credential to be identified based on a name of the server; and
    provide the credential to the server.

18. The computer-readable storage device of claim 17, wherein the application uses the multiple protocol stacks to communicate with the server during an open document dialog with the user.

19. The computer-readable storage device of claim 17, wherein the application uses the multiple protocol stacks to communicate with the server during a save-as dialog with the user.

20. The computer-readable storage device of claim 17, further comprising: after the application closes, using the credential to synchronize a local copy of a document with a copy of the document stored at the server without prompting the user for the credential.

* * * * *